United States Patent [19]

Forster et al.

[11] Patent Number: 5,304,312
[45] Date of Patent: Apr. 19, 1994

[54] FILTER ASSEMBLY INCLUDNG FILTER UNIT HAVING DEFORMABLE SEALING END CAPS

[75] Inventors: Donald M. Forster, Penfield; Peter J. Despard, Hamlin, both of N.Y.

[73] Assignee: Eastman Kodak Company, Rochester, N.Y.

[21] Appl. No.: 920,403

[22] Filed: Jul. 27, 1992

[51] Int. Cl.⁵ .............................................. B01D 43/00
[52] U.S. Cl. ...................... 210/808; 210/232; 210/321.74; 210/321.83; 210/354; 210/356; 210/357
[58] Field of Search ............... 210/808, 649, 321.72, 210/321.74, 321.83, 232, 433.1, 457, 497.1, 357, 359, 435, 458, 321.77, 354, 356, 445, 446; 220/209; 285/901

[56] References Cited

U.S. PATENT DOCUMENTS

| | | | |
|---|---|---|---|
| 3,112,262 | 11/1963 | Parkinson | 210/130 |
| 3,722,696 | 3/1973 | Dwyer et al. | 210/435 |
| 3,771,660 | 11/1973 | Smith | 210/232 |
| 3,814,258 | 6/1974 | Ayres | 210/359 |
| 4,028,253 | 6/1977 | Miller et al. | 210/321.74 |
| 4,139,469 | 2/1979 | Rainin et al. | 210/136 |
| 4,289,583 | 9/1981 | Engel | 196/115 |
| 4,375,409 | 3/1983 | Gentry | 210/232 |
| 4,505,816 | 3/1985 | Wozniak et al. | 210/446 |
| 4,592,839 | 6/1986 | Rosenberg | 210/352 |
| 4,634,527 | 1/1987 | Marshall | 210/232 |
| 4,824,564 | 4/1989 | Edwards et al. | 210/232 |
| 5,078,864 | 1/1992 | Whittier | 210/321.84 |
| 5,108,604 | 4/1992 | Robbins | 210/321.74 |
| 5,141,637 | 8/1992 | Reed et al. | 210/323.2 |
| 5,221,473 | 6/1993 | Burrows | 210/232 |

Primary Examiner—Robert A. Dawson
Assistant Examiner—Ana M. Fortuna
Attorney, Agent, or Firm—Carl F. Ruoff

[57] ABSTRACT

A sealed filter unit is provided having end caps which engage fluid connectors which are in turn connectable to external piping conveying fluid through the filter and which provide a preliminary seal upon mounting the filter unit in the filter holder. The filter unit assures that all fluid passing through the unit is filtered in a single pass without wetting the filter holder into which the filter unit is mounted via the fluid connectors. The filter holder allows rapid and reliable insertion and removal of the filter unit to and from the filter holder. The filter holder will accept various sizes of filter units as required by the process. In the preferred embodiment, the fluid connectors are a part of the filter holder. In the absence of fluid pressure, the filter unit can be manually removed from the filter holder fluid connectors for replacement of the filter unit. The end caps deform under internal fluid pressure to lock the filter unit in place and to improve the fluid-tight seals between the end caps and the fluid connectors. A dutchman is provided for operations in which a filter element is not required or cleaning is required.

26 Claims, 9 Drawing Sheets

FILTER ASSEMBLY INCLUDING FILTER UNIT HAVING DEFORMABLE SEALING END CAPS

BACKGROUND OF THE INVENTION

1. Technical Field

The present invention relates to fluid filter assemblies and, more particularly, relates to rolled filter assemblies which have universal applications and which can be removed and installed in a short period of time.

2. Background Art

In a wide variety of fluid processes, it is necessary to remove particles from the fluid by filtration at one or more points in the process. In certain fluid processes, the requirement for various sized filters is dictated by the desired fluid flow rate through the filters, the time intervals or durations between filter changes, the amount of particles in the fluid, and the degree of particle removal that is necessary or desired. In certain processes, where the time interval between filter changes is relatively short, it is important to minimize the amount of liquid that is wasted when the filter is changed, and to minimize the labor and time required to change the filter. In addition, certain processes require that the time required to change a filter be relatively short to minimize interruption of the process.

In many fluid processes, internal bypass of unfiltered fluids is unacceptable. That is, it is extremely important that the filter operate in a manner such that no unfiltered fluid is allowed to bypass the filter medium. In addition to the reliable operation of the filter, it is also desirable to provide a filter that cannot be incorrectly inserted in the filter system in such a manner that such bypass is permitted.

In addition, in many processes involving the use of toxic or hazardous liquids, external leakage of the liquid through assembly error or through failure of the filter is unacceptable.

In many instances, the filters of such processes are self-contained and are directly connected to the liquid conduit of the system. However, filters of this type have a very limited field of use since they are generally compatible with only a single size fluid conduit and only a single connector design. In addition, replacement of such self-contained filters is a relatively time-consuming process and thus may require that the system be shut down for relatively long periods of time while the filter is being replaced. Moreover, the chances of assembly error are relatively high due to the complicated connectors associated with self-contained filters.

Increased flexibility of filtration systems can be provided by designing filter holders integral with the system. Replacement of such filters can be performed relatively quickly by removing the used filter from the holder and by placing a new filter in the holder. However, the flexibility of such devices is limited by the physical dimensions of the filter since typical filter holders are designed to accommodate a filter unit of a single diameter and since these holders have fixed connectors which are suitable for connection to only specific sizes and types of external fluid conduits or piping. Moreover, since the filter units are not self contained, the interior surface of the filter holders is wetted, that is, the filter holder is in direct contact with the fluids. This is undesirable in situations where the fluid is either difficult to clean, incompatible with the materials of the holder, or presents environmental or safety concerns when the filter element is removed from the filter holder after use.

There has thus been a need for the provision of a filter assembly which is flexible, simple, and which can be reliably installed in a relatively short period of time.

There has also been the need for the provision of a filter assembly which includes a self-contained filter which is mounted in a filter holder but which does not wet the filter holder.

There has also been a need for the provision of a filter unit which prevents internal bypass of the fluid being filtered and external leakage of the fluid during filtration but which can be quickly and easily inserted into and removed from a filtration system and which is compatible with a variety of external fluid conduit sizes.

There has also been a need for the provision of a filter unit which is compatible with many different pipe sizes and connector designs and which therefore has universal applications.

There has also been a need for a filter unit which allows for easy change in the filter medium area and dirt handling capacity.

There has also been the need for a filter unit having a filter and holder made of opaque materials so that light sensitive fluids may be filtered in a lighted area.

There has also been the need for a filter unit that allows for use of the system when a filter is not required such as during a cleaning operation.

SUMMARY OF THE INVENTION

These needs have been satisfied by providing a filter assembly comprising a rigid filter holder, a sealed filter unit having a pair of end caps, the end caps having bores formed therein for the passage of fluid and the end caps being mountable within the filter holder. In a preferred embodiment, the fluid connectors are formed as part of the filter holder. The end caps, when mounted within the filter holder deflect inwardly to form sealed connections with the fluid connectors. The end caps are outwardly deformable under fluid pressure within the filter unit to improve the sealed connection between the fluid connectors and the end cap.

The need for providing a flexible system which can be installed reliably, quickly, and easily has been further satisfied by providing fluid connectors as part of the filter holder each of which includes a female portion having a sealing element located therein, and by providing end caps which comprise a male portion, which selectively engages the sealing element, and an internal surface which extends generally in parallel with the sealing element and which is subject to contact by fluid when the filter assembly is in use. In order to amplify the pressure in the sealing element, the area of the internal surface is larger than the area of the sealing element.

This need is still further satisfied by constructing each end cap from molded plastic and bonding the end cap to a respective axial end of a filter element. Each of the end caps is essentially cylindrical in shape and includes an annular surface having an external face, a hollow frusto-conical neck which extends outwardly from the external face, through which one of the bores is formed, and which forms a male portion for engagement with a female portion of the fluid connector, and an essentially cylindrical shell which surrounds the annular surface and which has an outer axial end surrounding the external face.

In order to promote air purging, fluid drainage and the desired bowing effect, the annular surface of each of the end caps is essentially frusto-conical in shape and extends from an inner radial periphery of the shell to the base of the neck. Each of the end caps includes a plurality of external ribs each of which extends radially from the inner radial periphery of the shell to the neck and which extends axially from the external face to a position which is essentially co-planar with the outer axial end of the shell. The shell has an internal axial end which surrounds an internal face of the annular surface of the end cap, the internal end of the shell being flared outwardly from the internal face to facilitate insertion of the filter element in the end cap, wherein a plurality of internal ribs extend radially from an inner radial periphery of the shell to the neck and provide support for the end cap while providing channels for the transfer of fluid between the neck and the axial end of the filter element.

These needs are also satisfied by providing a method of filtering solutions comprising the steps of mounting first and second end caps of a filtration unit having a filter element sealed to the end caps, on a filter holder having fluid connectors integral therewith such that sealed connections are formed between the fluid connectors and the end caps upon mounting. Other steps include conveying fluid into the first fluid connector, through the first end cap and the filter element, and out of the second end cap and the second fluid connector, and axially deforming the end caps by fluid pressure in the filter unit, thereby forcing the end caps into tighter engagement with the fluid connectors and improving the sealed connection.

The means to prevent internal leakage of fluid is provided by conveying the fluid axially through a central opening in the first end cap, then directing the fluid radially away from the central opening, then conveying the fluid axially through a channel formed between fluid impermeable spacer layers of a filter element and through filter medium connected to the adjacent impermeable layers, and then directing the fluid to a central opening formed in the second end cap.

The need for providing a filter element with universal applications is further satisfied by providing a filter assembly comprising a rolled filter element having first and second ends, and first and second end caps sealed to the first and second ends of the rolled filter element. Also provided are an opaque reinforcing tape wound around the rolled filter element to prevent radial expansion, a filter housing which axially supports the rolled filter element, and means for forming a fluid-tight connection between each of the first and second end caps and external piping elements under fluid pressure within the filter unit and for at least partially releasing the fluid-tight connection in the absence of the fluid pressure.

BRIEF DESCRIPTION OF THE DRAWINGS

The above and further objects of the invention will become more readily apparent as the invention is more clearly understood from the detailed description to follow, reference being made to the accompanying drawings in which like reference numerals represent like parts throughout, and in which.

DETAILED DESCRIPTION OF THE PREFERRED EMBODIMENTS

In accordance with the present invention, a sealed filter unit is provided having end caps which engage fluid connectors which are part of the filter holder. The fluid connectors are attached to external piping which conveys fluid through the filter unit. The filter unit assures that all liquid passing through the unit is filtered. The fluid connectors locate the filter unit in the filter holder which allows rapid and reliable insertion and removal of the filter unit by an unskilled operator and which provide a preliminary seal upon mounting the filter unit in the filter holder. In the absence of fluid pressure, the filter unit can be manually removed from the filter holder by removing the locking pins from the filter holder and raising the end plate. "Manually", in this context, is to be understood to comprise the manipulation or carrying out by a single operator without the use of tools. The end caps flex axially under internal fluid pressure to lock the filter unit in position and to improve the liquid-tight seals between the end caps and the fluid connectors.

Figure 1:
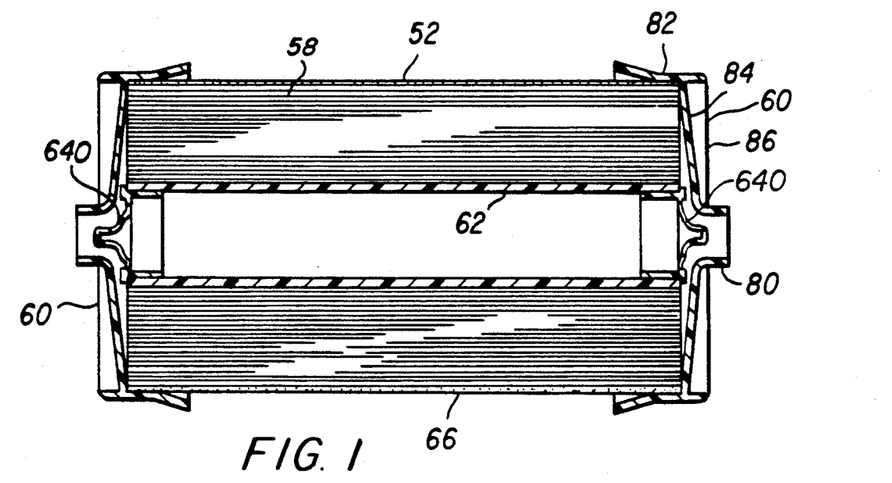
FIG. 1 is a sectional plan view of a filter unit constructed in accordance with a first embodiment of the invention.
Figure 2:
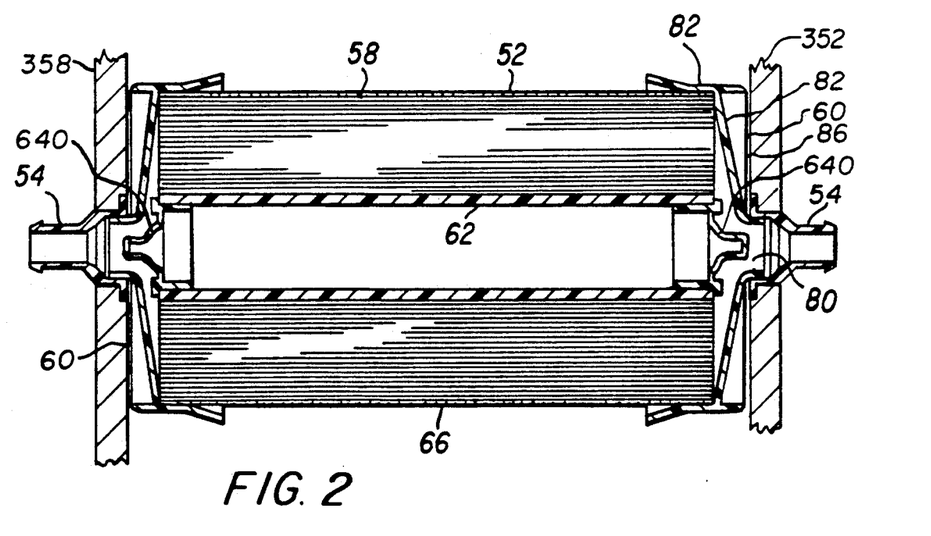
FIG. 2 is a sectional plan view of the filter unit of FIG. 1 having connectors fitted on the end caps as part of a filter holder.
Figure 3:
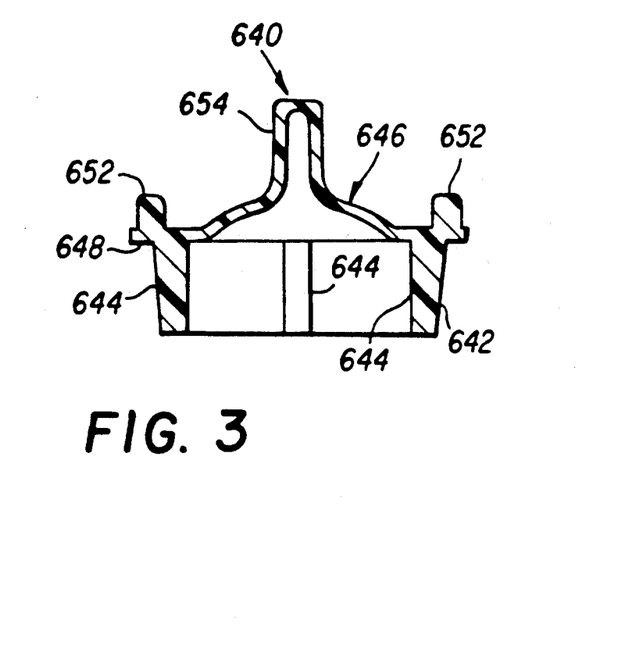
FIG. 3 is a sectional elevational view of a filter core plug.
Figure 4:
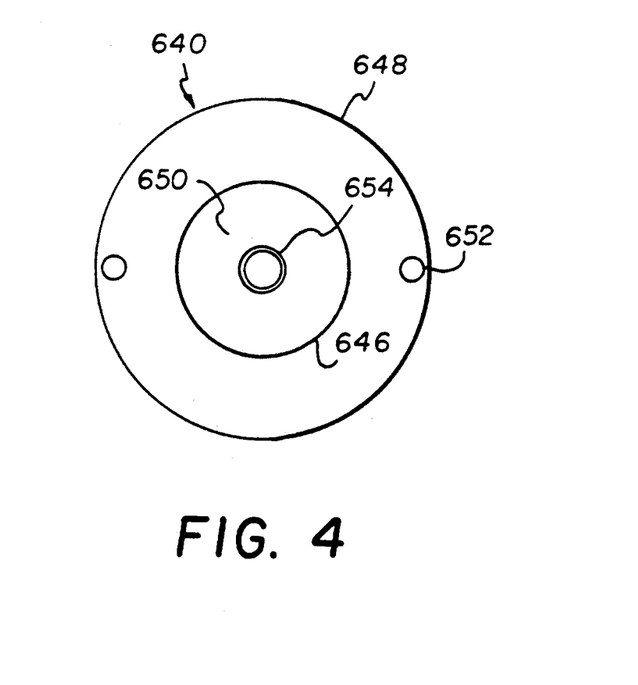
FIG. 4 is a top view of a filter core plug.

Referring to FIGS. 1 and 2, the filter unit 52 includes a filter element 58 which is rolled around a hollow cylindrical polypropylene core 62 in a spiral. Core 62 extends axially through the center of the filter element 58 and is closed by core plugs 640 which seal the core, thus assuring that fluid flowing through the filter must pass axially through the filter element 58. In the illustrated embodiment, the plugs 640 are joined with the core 62 with hot melt.

Illustrated in FIGS. 1, 2, 3 and 4, core plugs 640 are provided which are formed of separate elements which fit axially inside the core 62. Each of these plugs includes a frusto-conical portion 642 which slides inside the core 62 and which is reinforced by a plurality of axially extending ribs 644. The outer axial end of each plug 640 is sealed by an end surface 646 having an annular flange 648 which engages the end caps of the filter unit in a manner discussed in more detail below. The central portion of this end surface is bowed outwardly in an essentially frusto-conical manner to help direct fluid into the filter element 58. Bowed portion of end surface 646 also prevents retention of fluid in the core plug after use and reduces the amount of fluid in the filter unit during use, thereby minimizing the loss of fluid when the filter unit is replaced. Additional radial direction of fluid is provided by a central protrusion 654 which extends axially into the neck of the end cap 60. A pair of protrusions 652 are provided on flange 648 and extend between internal ribs of the end caps, described in more detail below, to prevent relative rotation between the core plugs 640 and the end caps 60 during assembly.

An opaque fiberglass-reinforced tape 66 is wrapped around the periphery of the filter element 58 to prevent radial expansion of the filter element. Fiberglass reinforced tape wrap is well known, and can withstand pressures of 125 psi or more without loss of physical integrity.

Figure 9:
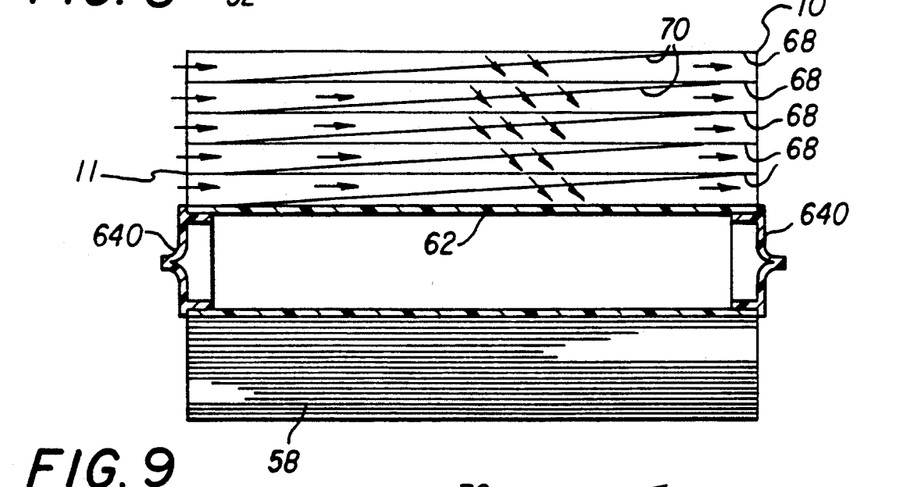
FIG. 9 is a sectional view of the rolled filter element of the filter unit of FIGS. 1 and 2.
Figure 10:
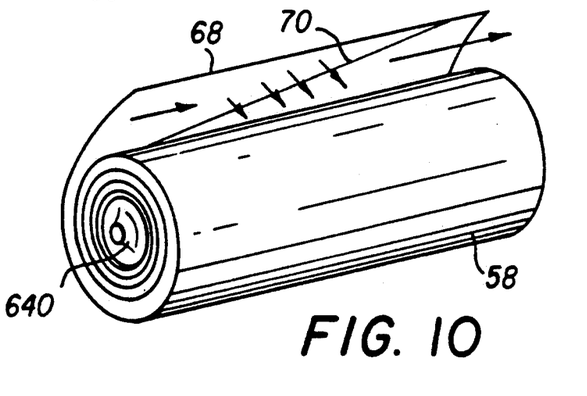
FIG. 10 is a perspective view of the filter element of FIG. 9 having the outer layer cut open for the sake of illustration.

Referring to FIGS. 9 and 10, filter element 58 comprises a layer of corrugated fluid-impermeable spacer material 68 wound in a spiral around core 62. A layer of filter medium 70 is attached at one end 10 of the inner surface of spacer material 68 and at the other end 11 to the outer surface of spacer material 68. This construction provides channels via which the fluid can flow through the filter element, thus facilitating the flow of fluid through the filter unit once the fluid enters the spaces between the adjacent spiral wound layers. Each of the opposed ends of the filter medium layer 70 is connected to a respective end of one of the adjacent spacer layers, thus diagonally connecting the two layers and assuring that any fluid flowing between the two layers must pass through the filter medium. In use, fluid is forced axially through the spaces formed between the layers 68 of spacer material in the direction shown by the arrows in FIGS. 9 and 10, passes through the filter medium 70 where particles are removed, and exits at the far end of the filter element. Spiral filters, also called rolled filters, are, per se, well known, as exemplified by U.S. Pat. No. 3,722,696 to Dwyer et al.

The axial ends of the filter element are enclosed within end caps 60 which direct the flow of fluid through the filter and which bow or deform outwardly under fluid pressure within the filter unit to provide a fluid-tight seal between the end caps and the associated connectors. Each end cap 60 is molded from opaque plastic and is bonded to a respective axial end of the filter element 58. Each end cap 60 is essentially frusto-conical in shape, and has a hollow cylindrical neck 80 extending outwardly from the external face of the end cap. This neck forms a male member or portion for engagement with a female member or portion of fluid connector 54 (FIGS. 1 and 2) or 376 and 378 (FIGS. 11 and 12) in a manner discussed in more detail below.

Figure 5:
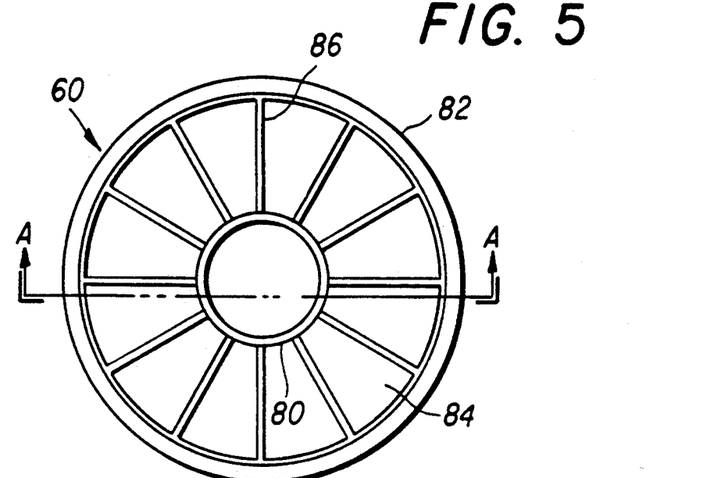
FIG. 5 is a plan view of the external face of an end cap of the filter unit of FIGS. 1 and 2.
Figure 7:
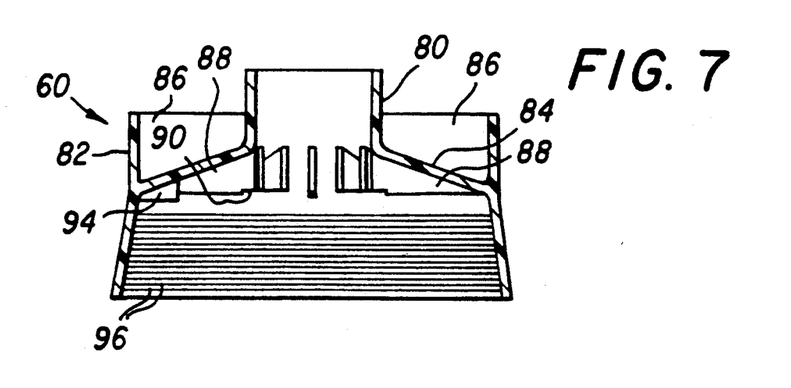
FIG. 7 is a sectional view of the end cap taken along the line A—A of FIG. 5.

The external face (FIGS. 5 and 7) of the end cap is bordered by a first axial end of an essentially cylindrical shell 82 and includes an external face of a curved or essentially frusto-conical surface 84 extending from the inner radial periphery of the shell to the base of neck 80. A plurality of external ribs or fins 86 extend radially from the inner radial periphery of shell 82 to the neck 80, with each rib extending axially from the external face of surface 84 to a position which is essentially coplanar with the outer axial end of shell 82. These ribs provide structural support for the end cap, thus prohibiting catastrophic rupturing of the end cap and telescoping of the filter element when the end cap bows axially under the pressure of fluid in the filter.

Figure 6:
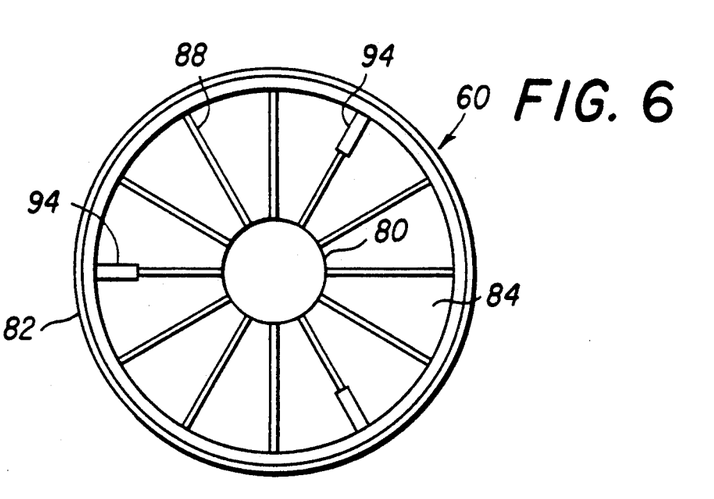
FIG. 6 is a plan view of the internal face of the end cap of FIG. 5.

The internal face (FIGS. 6 and 7) of the end cap is bordered by the other axial end of shell 82 and includes an internal face of surface 84. The shell 82 is flared slightly outwardly from the internal face of surface 84 to the inner axial end of the shell to facilitate insertion of filter element 58 into the end cap. A plurality of internal ribs or fins 88 extend radially from the inner radial periphery of the annular shell 82 to the neck 80. These ribs provide structural support for the filter element while also providing channels for the transfer of fluid between the central bore formed by the neck 80 of the end cap and the axial end of the filter element 58. Each rib includes a notch 90 which is formed at its inner radial end and which is designed to receive a supporting flange 648 of the associated core plug 640.

In addition, each of a number of evenly-spaced ribs includes an axial protrusion 94 which is wider and axially longer than the remainder of the rib. These protrusions provide two functions. First, they take up play between the end cap and the axial end of the filter element 58, thereby facilitating the manufacturing process and obviating the need for the provision of close tolerances during manufacture of the end cap and assembly of the filter unit. Second, they provide an internal gap between the majority of the internal ribs and the axial end of the filter element 58. This gap facilitates the assembly and improves the operation of the filter assembly in a manner discussed below.

Figure 8:
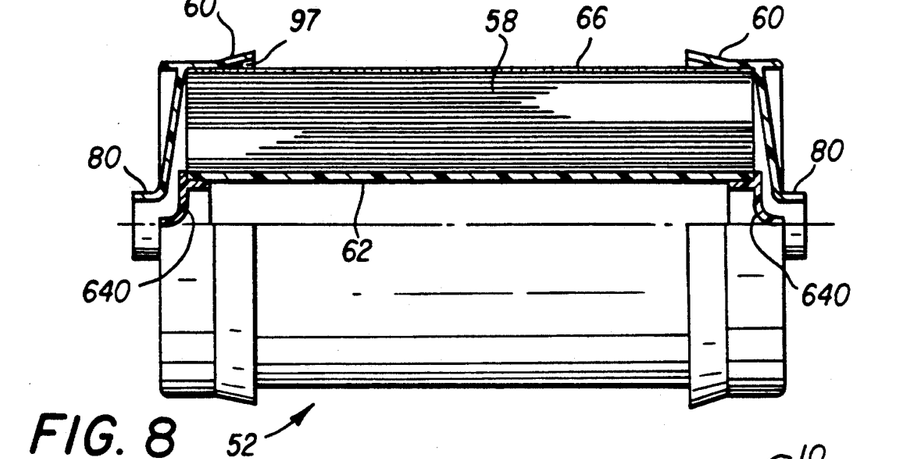
FIG. 8 is a perspective view of the filter unit of FIGS. 1 and 2 shown partially in cross section.

The inner radial periphery of the inner axial half of the shell 82 includes corrugations 96 which facilitate connection of the end cap 60 to the filter element 58. As illustrated in FIGS. 8 and 9, the radially outermost layer of spacer material 68 of the filter element 58 is connected to the inner radial periphery of the shell via a bead 97 which is formed from hot melt which fuses to the end cap and to the filter element before cooling, thus firmly attaching the end cap 60 to the filter element 58.

Figure 11:
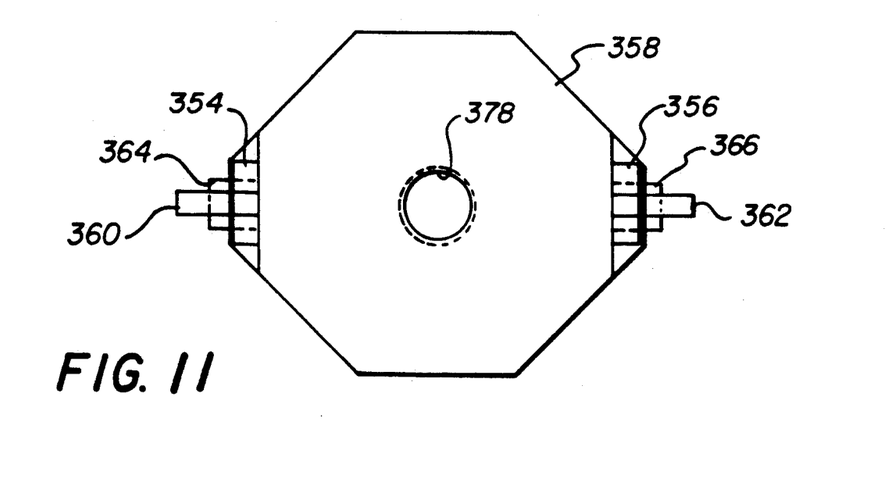
FIG. 11 is an end view of the filter holder of FIG. 12.
Figure 12:
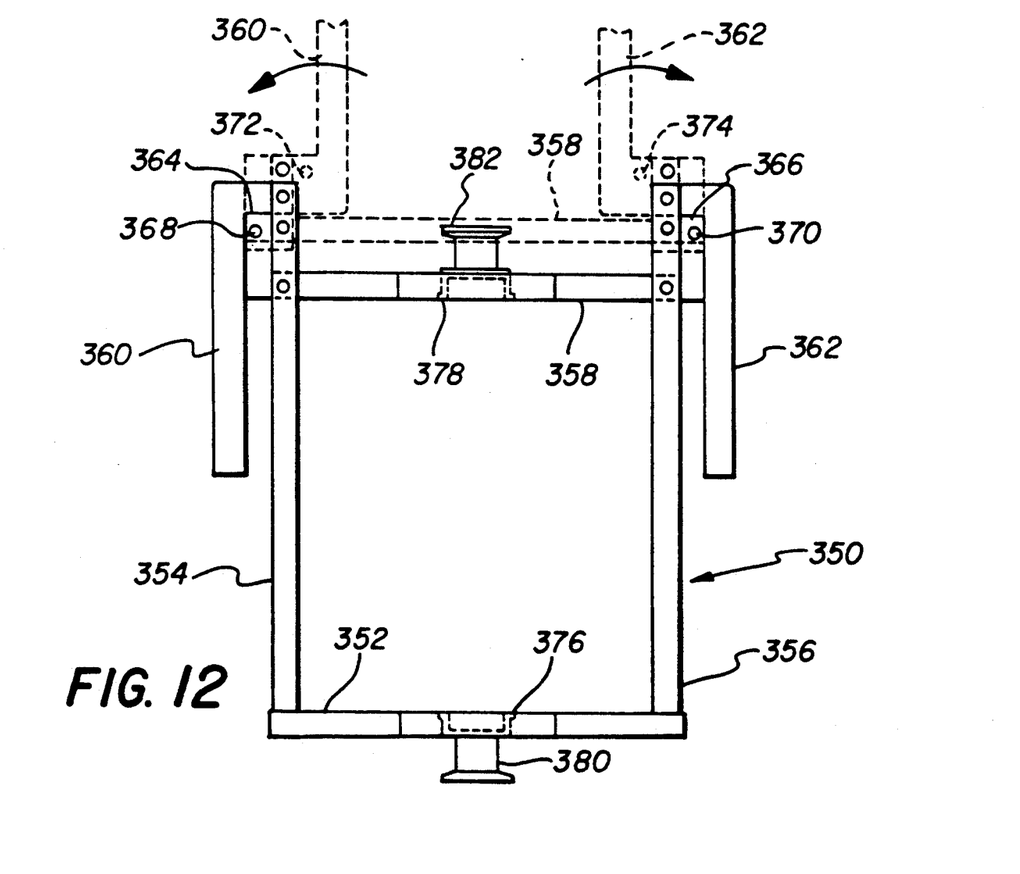
FIG. 12 is a front view of a filter holder constructed in accordance with an embodiment of the invention.

In the preferred embodiment of the present invention, the filter unit 52 is held by filter holder 350 which is shown in FIGS. 11 and 12. The filter holder 350 includes a first fixed end plate 352 which is rigidly connected to rigid side elements 354 and 356 and a second end plate 358 which moves axially in relation to side elements 354 and 356. Axial movement of the end plate 358 is provided by clevises and cam mechanisms which are shown generally at 364 and 366 and which interconnect the handles 360 and 362, the end plate 358 and the side elements 354 and 356. Holes 368 and 370 are formed in the clevises of mechanisms 364 and 366 and are aligned with corresponding holes 372 and 374 in handles 310 and 362 when the handles are rotated to the position illustrated in solid lines in FIG. 12 for insertion of locking pins. Inlet and outlet openings 378 and 376 are formed in the center of end plates 358 and 352 for the insertion of fluid connectors 382 and 380. The fluid connectors are formed integral with the end plates 358 and 352. The fluid connectors are press fitted into the end plates 358 and 352 and retained with retaining compound. Other methods of forming an end plate with a fluid connector are possible.

In use, the filter holder is mounted on a suitable surface in the position illustrated in dotted lines in FIG. 12 with the openings 376 and 378 of end plates 352 and 358 aligned with suitable lines or pipings for conveying fluid through the filter. The holder is preferably mounted vertically with the inlet 378 positioned above the outlet 376 so that the filter is self-draining after use and also allows air to be forced through the filter after use to aid in fluid removal. The filter can also be vertically mounted so that the outlet 378 is above the inlet 376.

To ready the filter for use, a filter unit of the type described above is placed in the filter holder 350. The fluid connector 380 is formed integrally with end plate 352. The fluid connector 380 has been connected to an outlet fluid pipe, (not shown). Positioning the filter unit in this manner is made possible by previously rotating the handles 360 and 362 to the positions illustrated in dotted lines in FIG. 12 so that the end plate 358 is positioned axially away from the end plate 352 to allow insertion of the filter unit in the holder.

Figure 13:
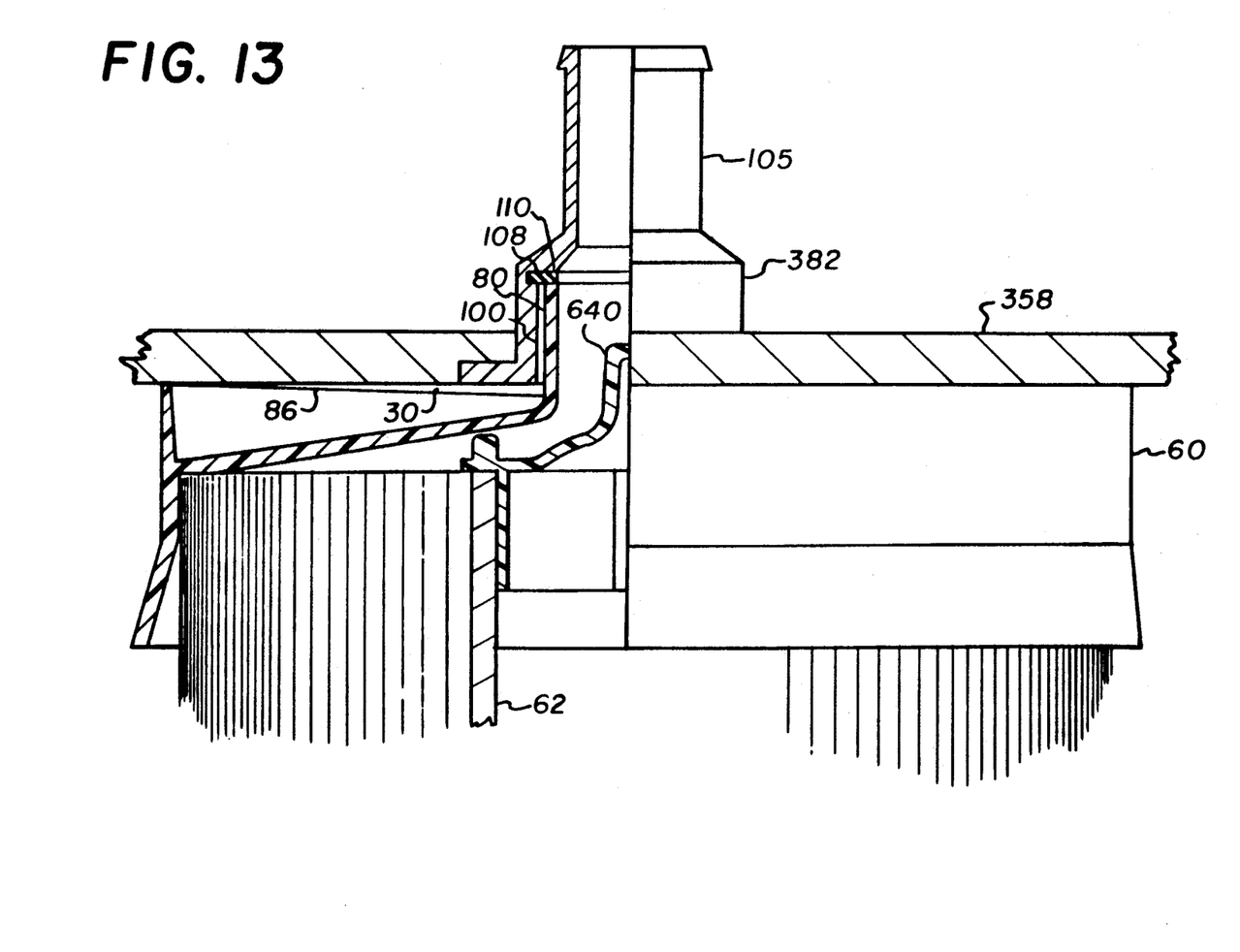
FIG. 13 is a sectional view of the end cap and filter holder of the present invention.

Next, the handles 360 and 362 are rotated towards the positions illustrated by solid lines in FIG. 12, causing the end plate 358 to move axially toward the position illustrated by solid lines. During this movement, the fluid connector 382 mates with the neck 80 of the end cap 60 compressing gasket 108, as shown in FIG. 13, thereby providing a preliminary fluid seal between the end caps and the fluid connectors. The perimeters of the end caps contact the surfaces of the end plates and are thereby restrained. Further axial movement of the end plate 358 toward the end plate 352 bows or deforms the end caps of the filter unit inwardly as shown in FIG. 13 as the triangular gap 30 between 86 and 358. The closure handles create an overcenter latching mechanism in the closed position with the filter in place. The axial force generated by the pressure in the filter helps to restrain the handles 360, 362, linkages 364, 366 and plate 358 in the closed position. This design includes locking pins that pass through the handles 360, 362 and clevis linkage 364, 366 locking the holder in the closed position to prevent accidental opening during operation.

When the handles are rotated into their optimum positions, the holes 368 and 370 in the clevises will become aligned with the holes 372 and 374 in the handles. The holder can then be locked in its closed position simply by inserting pins through the holes 368, 372 and 372, 374. The process piping does not need to be connected or disconnected for filter changes with this hardware.

Shown in FIG. 13 is a sectional view of the end cap 60, filter unit 58 and filter holder end plate 358 of the present invention. The end plate 358 includes fluid connector 382 which includes an inner cylindrical portion 100 forming a female member or portion for engagement with the male member or portion formed by the neck 80 of the associated end cap 60. The outer portion 105 of the fluid connector 382 forms a portion for connection to external piping. The fluid connector 382 may be constructed from stainless steel or from any other material which is compatible with the fluids being filtered and is sufficiently strong to withstand the stress imposed on the connector by fluid pressure in the filter and the stress of the piping system.

The filter holder 350 and the filter unit 52 are dimensioned such that the end caps 60 deform or flex inwardly slightly when the connectors are inserted into the fluid connectors 380, 382 of the end plates 352, 358, 114, thereby additionally stressing the neck 80 of the end caps against the gaskets 108 of the connectors 380, 382 thereby establishing a seal. An internal sealing element, which in the illustrated embodiment comprises a replaceable gasket 108, is provided in the transition area 110 of the fluid connector. As illustrated in FIG. 13, the neck 80 of the end cap 60 is inserted into the interior of the inner portion 100 of the fluid connector 382 and contacts the gasket 108 with a tapered space 30 being formed between the innermost end of external ribs 86 of the end cap 60 and the end plate 358. This gap assures that forces imposed by the axial deformation of the end cap 60 will be imposed on the gasket 108, thus improving the fluid-tight connection between the end cap and the connector in a manner discussed in more detail below.

As pressure increases within the filter unit, the end caps of the present invention deform by bowing outward. As this occurs the axial space 30 between the external ribs 86 of the end cap 60 and the end plate 358 is reduced to zero. At this point the end plate 358 prevents further deformation of the end cap. This design allows for a greater operating pressure within the filter unit without catastrophic failure of the unit.

The design of the present invention maximizes the pressure on the gasket 108. The sealing pressure on the gasket 108 is approximately equal to the pressure within the filter unit during operation multiplied by the area of the end cap divided by the area of the gasket. Thus, as the pressure within the filter unit increases, the sealing pressure increases by an amount proportional to the area of the end cap divided by the area of the gasket.

Fluid is forced through the inlet connector and end cap and into the filter to effect a filtration process. So long as the pressure within the filter unit 52 is relatively low, the preliminary seal provided by assembling the assembly 50 will provide an adequate seal between the end caps 60 and the fluid connectors 380, 382. As the fluid pressure within filter unit 52 increases, the pressure within the filter causes the end caps 60 to bow axially outwardly, forcing the neck into tighter engagement with the gasket 108, thereby further compressing the gasket 108 and providing a more secure seal between the end caps 60 and the connectors 380, 382 without the manipulation of any connection or sealing elements. Because the sealing force is provided by the fluid pressure within the filter, it is unnecessary to provide additional sealing elements at higher pressures since the increased axial expansion of the end caps at such higher pressures provide additional sealing force between end caps 60 and the fluid connectors 380, 382.

As the pressure within the filter increases, the end caps bow outwardly further, thus further compressing the gaskets 108 and providing an even tighter seal. Since each end plate is designed to absorb and distribute the stresses imposed on the outer surface of the end cap by the fluid within the filter, the diameter of the end plate should be as large as the diameter of the end cap in order to assure adequate distribution of forces.

When the flow of fluid through the filter unit 52 is terminated, the pressure within the filter unit is relieved and the end caps 60 return to their initial positions, thus partially relieving the axial pressure on the gasket and the neck of the end cap. Accordingly, the end caps of the filter unit can be removed from the filter holder and the filter unit 52 can be manually lifted out of the filter holder. The filter connectors 380, 382 remain attached to the external piping.

Figure 14:
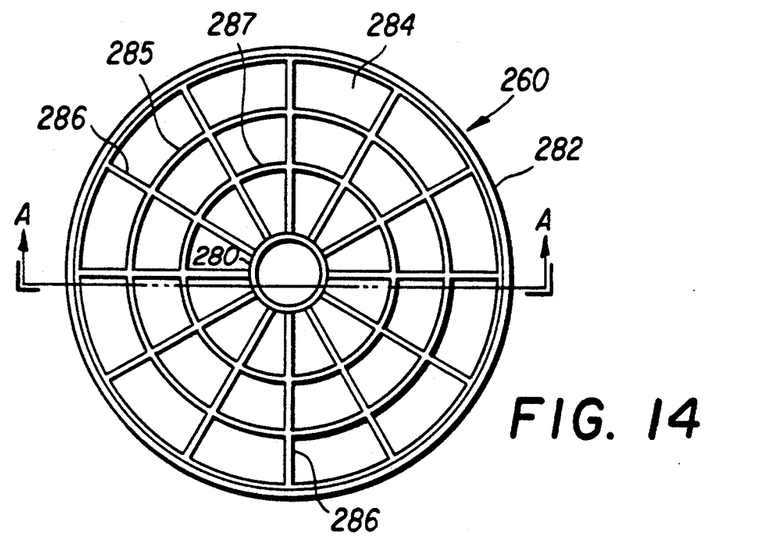
FIG. 14 is a plan view of the external face of another end cap constructed in accordance with the present invention.
Figure 15:
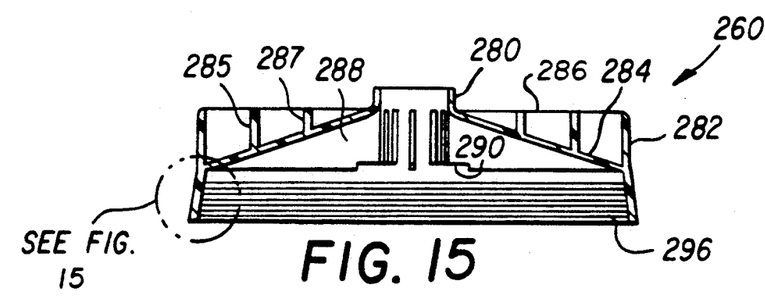
FIG. 15 is a sectional view taken along the line A—A in FIG. 14.
Figure 16:
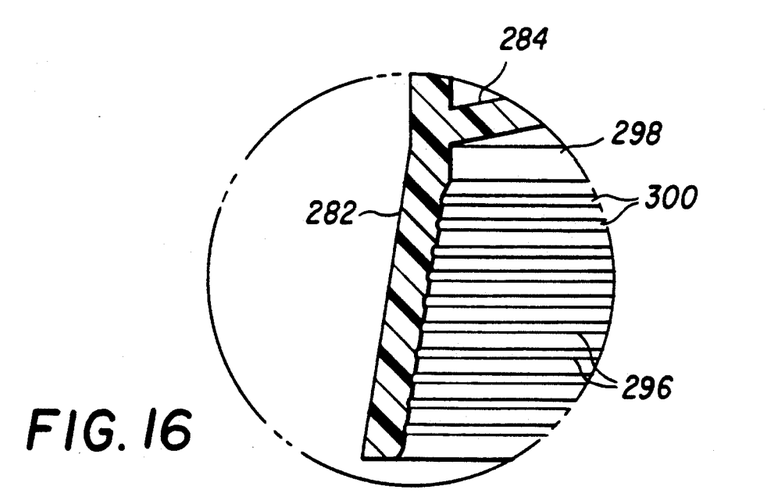
FIG. 16 is an enlarged view of detail circled in FIG. 15.
Figure 17:
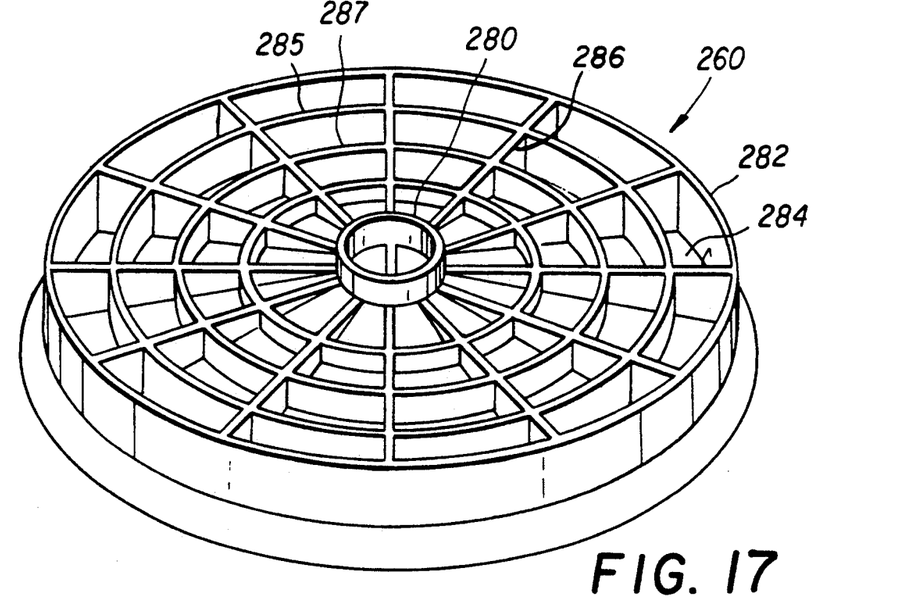
FIG. 17 is a perspective view of the external face of another end cap.
Figure 18:
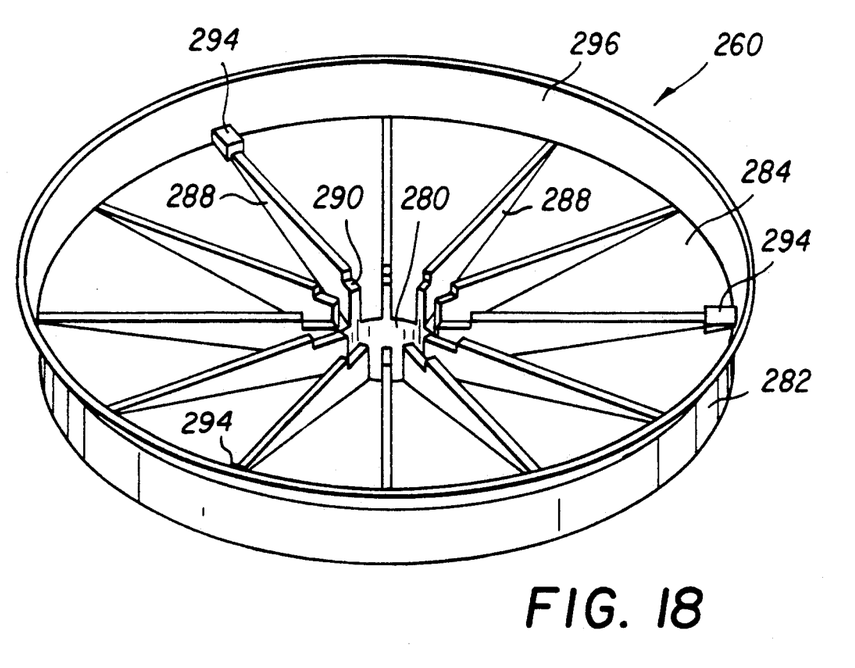
FIG. 18 is a perspective view of the internal face of the end cap.

Higher pressures can be tolerated within the filter unit by additionally reinforcing the end caps of the filter unit. Such an embodiment is shown in FIGS. 14-16. An embodiment having an additional rib is shown in FIGS. 17 and 18. Reinforcement of the end caps is particularly desirable if the filter unit must be relatively large in diameter to permit a relatively high rate of fluid flow through the filter unit. To this end, concentric circular reinforcement fins or ribs 285 and 287 may be provided on the external face of an end cap 260 between the neck 280 and the shell 282 as illustrated in FIGS. 14-18. These ribs 285, 287 provide structural support for the radial ribs. The annular ribs 286 prevent torsional deflection of the radial ribs 285, 287. Additional circular or radial ribs could be provided to provide additional support, if desired. End cap 260 is otherwise identical to the end cap discussed above, and includes a neck 280, an essentially cylindrical shell 282, a surface 284 extending from the inner radial periphery of the shell to the base of the neck, a plurality of external radial support ribs or fins 286, and a plurality of internal radial ribs or fins 288 having notches 290 and protrusions 294 formed thereon.

The shell 282, like the shell 82 of the first embodiment, has corrugations 296 formed on the inner peripheral surface to provide an attachment surface for the hot melt bead. As illustrated in FIG. 16, these corrugations are formed by providing a plurality of evenly-spaced circular ribs 298 on the inner peripheral surface of the shell 282 so that grooves 300 are formed between the ribs which receive the hot melt bead during the assembly process. This view also illustrates in greater detail the manner in which the essentially cylindrical shell 282 is flared outwardly at its inner end.

Another alternative is to provide an end cap which is suitable for use with medium-sized filter units and for intermediate fluid flow rates and pressures. This end cap differs from the end cap 260 only in that it would include only a single circular rib or fin positioned between the neck and the essentially cylindrical shell. This single rib provides a level of support intermediate to those provided by the ribs of the end caps of the first embodiment and the end caps of the second embodiment.

Figure 19:
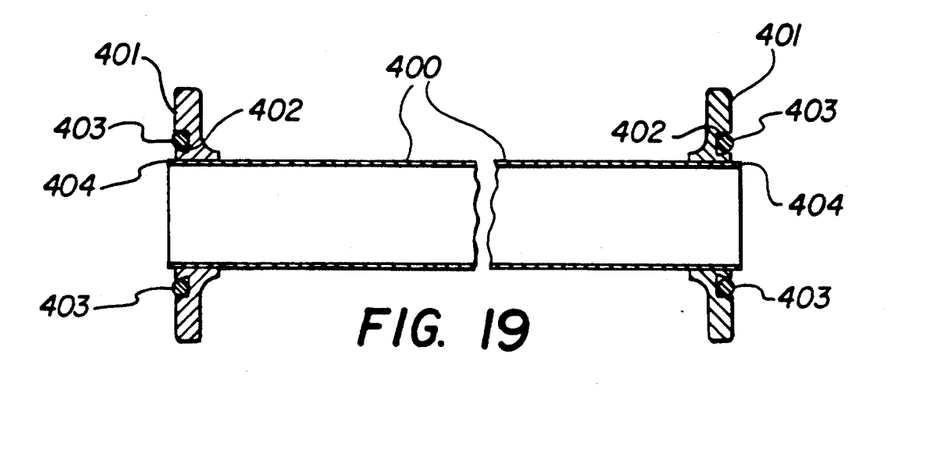
FIG. 19 is a cross sectional view of a dutchman used when a filter element is not required or when the system is cleaned.
Figure 20:
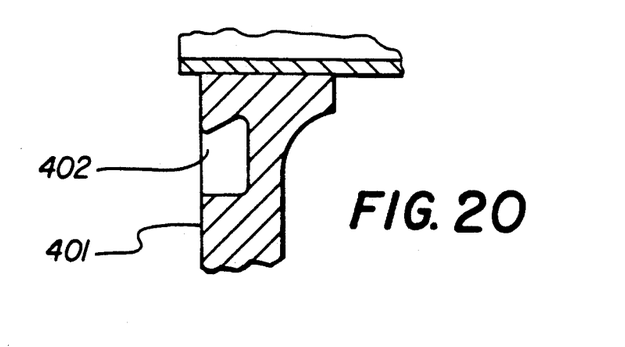
FIG. 20 is an enlarged view of the flange of the dutchman shown in FIG. 19.

During certain operations such as flushing of the system, it is desirable to remove the filter. The present invention includes a dutchman 400 which is shown in FIGS. 19 and 20. The dutchman is also referred to as a jumper pipe, or connector piece. The dutchman 400 includes a flange 401 which has an annular groove 402 in which an "O" ring 403 is inserted. FIG. 19 shows an enlarged view of the flange 401 and annular groove 402. The dutchman 400 has a raised lip 404 which mates with the female portion of the fluid connector. However, the lip does not contact the gasket 108 of the fluid connector; rather the fluid seal occurs between the "O" ring and the metal plate or flange of the filter holder. This system allows for quick changeover and insures that the fluid connector and gasket are flushed clean. The dutchman 400 provides a fluid connection which a filter is not required. This system allows all of the cavity formed between inner cylindrical portion 100 and the neck 80 (FIG. 13) to be flushed clean.

While specific embodiments of the invention have been described and illustrated, it will be clear that variations in the details of the embodiments specifically illustrated and described may be made without departing from the true spirit and scope of the invention as defined in the appended claims.

What is claimed is:

1. A filter assembly comprising:
   (A) a filter holder;
   (B) a sealed filter unit having at least two ends, each end having an end cap, said end cap having a bore formed therein for the passage of fluid; and
   (C) a pair of fluid connectors, each of which engages a respective one of said end caps, each fluid connector being connectable to external piping, each fluid connector being mounted in said filter holder and forming a sealed connection with said end cap when said end cap is engaged with said fluid connector and said sealed filter unit is mounted in said filter holder, wherein said end caps are outwardly deformable under fluid pressure within said filter unit.

2. The filter assembly as claimed in claim 1, wherein:
   said fluid connectors each includes a female portion having a sealing element located therein,
   each of said end caps comprises a male portion, which selectively engages said sealing element, and an internal surface which extends generally in parallel with said sealing element and which is subject to contact by fluid when said filter assembly is in use resulting in increased sealing forces as internal pressure within the filter unit increases, and
   the area of said internal surface is larger than the area of said sealing element.

3. The filter assembly as claimed in claim 2, wherein each of said fluid connectors comprises:
   an inner cylindrical portion which forms said female portion,
   an outer cylindrical portion which forms a male portion for connection with external piping, and an annular flange extending radially from an inner end of said inner cylindrical portion and being spaced axially from said one end cap when said end cap assumes a normal, non-deformed position.

4. The filter assembly as claimed in claim 3, further comprising:
   (D) a dutchman having at least two ends, each end having a sealing means, said dutchman having a bore formed therein for the passage of fluid when said filter unit is removed and said dutchman is inserted between said pair of fluid connectors, said sealing means of each end of said dutchman engaging said annular flange of each of said fluid connectors.

5. The filter assembly as claimed in claim 1, wherein said filter unit further comprises:
   a core extending axially through said filter unit in alignment with said bores of said end caps,
   a rolled filter element surrounding said core; and
   a tape wrap applied to an external peripheral surface of said rolled filter element.

6. The assembly as claimed in claim 5, wherein said core comprises a hollow cylindrical core, and wherein the axial ends of said core are sealed by core plugs.

7. The filter assembly as claimed in claim 6, wherein each of said core plugs comprises:
   a cylindrical portion which fits inside said core, and an end surface which seals the outer axial end of said cylindrical portion and which has an annular flange which seats on the respective end cap, said end surface having a central portion which is bowed axially outwardly in an essentially frusto-conical manner to help direct fluid into said filter element and to prevent retention of fluid in said core plug, said end surface further including a central protrusion which extends axially outwardly into the bore of said one end cap.

8. The filter assembly as claimed in claim 5, wherein said rolled filter element comprises a layer of a corrugated fluid-impermeable spacer material which is wound in a spiral around said core and one or more layers of filter medium, each of which is interleaved with said spacer material.

9. The filter assembly as claimed in claim 8, wherein each of the opposed ends of said one or more filter medium layers is connected to a respective end of the adjacent layer of spacer material, thereby assuring that fluid flowing between the spacer material must pass through said one or more filter medium layers.

10. The filter assembly as claimed in claim 5, wherein each of said end caps is constructed from molded plastic and is bonded to a respective axial end of said filter element.

11. The filter assembly as claimed in claim 5, wherein each of said end caps is essentially frustoconical in shape and includes:
an annular surface having an external face,
a hollow cylindrical neck which extends outwardly from said external face, through which one of said bores is formed, and which forms a male portion for engagement with a female portion of said fluid connector, and an essentially cylindrical shell which surrounds said annular surface and which has an outer axial end surrounding said external face.

12. The filter assembly as claimed in claim 11, wherein said annular surface of each of said end caps is essentially frusto-conical in shape and extends from an inner radial periphery of said shell to the base of said neck, and wherein each of said end caps includes a plurality of external ribs each of which extends radially from said inner radial periphery of said shell to said neck and which extends axially from said external face to a position which is essentially coplanar with the outer axial end of said shell.

13. The assembly as claimed in claim 12, wherein each of said end caps further comprises a circular rib positioned between said neck and said shell.

14. The assembly as claimed in claim 12, further comprising a bead of hot melt which bonds said filter element to said inner radial periphery of said shell.

15. The assembly as claimed in claim 11, wherein said shell has an internal axial end which surrounds an internal face of said annular surface of said end cap, said internal end of said shell being flared outwardly from said internal face to facilitate insertion of said filter element in said end cap, wherein a plurality of internal ribs extend radially from an inner radial periphery of said shell to said neck and provide support for the end cap while providing channels for the transfer of fluid between said neck and the axial end of, said filter element.

16. The assembly as claimed in claim 15, wherein the inner radial periphery of said internal axial end of said shell has corrugations formed thereon.

17. The assembly as claimed in claim 5, wherein said tape wrap, end caps and fluid connector are opaque.

18. The assembly as claimed in claim 1, wherein said filter holder comprises:
a plurality of side elements, a first end plate which is rigidly connected to said plurality of side elements and which has an opening formed therein for receiving one of said fluid connectors; and
a second end plate which is connected to said plurality of side elements and which has an opening formed therein for receiving the other of said fluid connectors, said second end plate being movable from a first position allowing insertion of said filter unit into said filter holder and removal of said filter unit from said filter holder to a second position in which said fluid connectors are received in said openings of said first and second end plates and in which said filter unit is held in position by said end plates.

19. The filter assembly as claimed in claim 18, further comprising mechanisms which connect said second end plate to said side elements and which move said second end plate axially of said side elements.

20. A filter assembly comprising:
(A) a rolled filter element having first and second ends;
(B) first and second end caps sealed on said first and second ends of said rolled filter element;
(C) a reinforcing tape wrap wound around said rolled filter element;
(D) a filter housing for supporting said rolled filter element; and
(E) means for forming a fluid-tight connection between each of said first and second end caps and external piping elements such that when fluid pressure increases within said filter element sealing force on the fluid tight connection increases.

21. The assembly as claimed in claim 20, wherein each of said end caps is deformable under fluid pressure within said filter assembly, and wherein said means for forming a fluid-tight connection comprises first and second fluid connectors each having a gasket which engages a portion of a respective one of said end caps, said gasket being compressed under deformation of said first, and second end caps.

22. The assembly as claimed in claim 20, wherein said tape wrap, end caps and fluid connectors are opaque.

23. A method of filtering solutions comprising the steps of
(A) providing first and second fluid connectors on a filter holder;
(B) mounting first and second end caps of a filtration unit having a filter element sealed to said end caps on said first and second fluid connectors such that sealed connections are forced between said fluid connectors and said end caps;
(C) conveying fluid into said first fluid connector, through said first end cap and said filter element, and out of said second fluid connector; and
(D) axially deforming said end caps by fluid pressure in said filter unit, thereby forcing said end caps into tighter engagement with said fluid connectors and improving said sealed connections.

24. The method as claimed in claim 23, wherein said step (C) comprises:
conveying said fluid axially through a central opening in said first end cap, then directing said fluid radially away from said central opening, then conveying said fluid axially through a channel formed between adjacent spacer layers of a filter element and through a filter medium connected to said spacer layers, and then directing said fluid radially toward a central opening formed in said second end cap.

25. The method as claimed in claim 23, further comprising the step of amplifying the sealing forces between the end caps and fluid connectors by increasing the fluid pressure within said filtration unit.

26. The method as claimed in claim 23, further comprising the steps of:

terminating the flow of fluid through said filter unit, and manually removing said filter unit from said fluid connectors on said filter holder including said end caps.

* * * * *